(12) United States Patent
Celona et al.

(10) Patent No.: US 9,781,963 B1
(45) Date of Patent: Oct. 10, 2017

(54) HELMET MOUNT FOR VIEWING DEVICE

(75) Inventors: Marc J. Celona, Dover, NH (US);
Gary M. Lemire, Lee, NH (US);
James W. Teetzel, York, ME (US)

(73) Assignee: Wilcox Industries Corp., Newington, NH (US)

( * ) Notice: Subject to any disclaimer, the term of this patent is extended or adjusted under 35 U.S.C. 154(b) by 1272 days.

(21) Appl. No.: 12/759,435

(22) Filed: Apr. 13, 2010

Related U.S. Application Data

(60) Provisional application No. 61/168,789, filed on Apr. 13, 2009.

(51) Int. Cl.
*A42B 1/24* (2006.01)
*A42B 3/04* (2006.01)
*G02B 23/12* (2006.01)
*A42B 3/22* (2006.01)
*A42B 3/18* (2006.01)

(52) U.S. Cl.
CPC .............. *A42B 3/042* (2013.01); *A42B 3/185* (2013.01); *A42B 3/223* (2013.01); *G02B 23/125* (2013.01)

(58) Field of Classification Search
CPC .............................. G02B 23/12; G02B 23/125
USPC ................ 2/6.1–6.8, 422; 359/411, 413, 817
See application file for complete search history.

(56) References Cited

U.S. PATENT DOCUMENTS

| | | | |
|---|---|---|---|
| 3,548,411 A * | 12/1970 | Barstow | A42B 3/042 2/6.5 |
| 4,156,292 A | 5/1979 | Helm et al. | |
| 4,242,757 A | 1/1981 | Nava | |
| 4,449,787 A | 5/1984 | Burbo et al. | |
| 4,577,347 A | 3/1986 | Connon | |
| 4,660,943 A | 4/1987 | Ellis | |
| 4,689,834 A | 9/1987 | McCarthy et al. | |
| 4,901,210 A | 2/1990 | Hanabusa | |
| 4,987,608 A | 1/1991 | Cobb | |
| 5,265,276 A | 11/1993 | Kimberly, Jr. | |
| 5,367,402 A | 11/1994 | Holmes et al. | |
| 5,408,086 A | 4/1995 | Morris et al. | |
| 5,412,811 A | 5/1995 | Hildenbrand et al. | |
| 5,416,922 A | 5/1995 | Horvat et al. | |
| 5,467,479 A | 11/1995 | Mattes | |
| 5,469,578 A * | 11/1995 | Mattes | 2/6.7 |
| 5,471,678 A | 12/1995 | Dor | |
| 5,506,730 A | 4/1996 | Morley et al. | |
| 5,535,053 A | 7/1996 | Baril et al. | |

(Continued)

FOREIGN PATENT DOCUMENTS

| | | |
|---|---|---|
| FR | 2677604 | 12/1992 |
| GB | 2470831 A | 12/2010 |
| WO | WO2006065805 A2 * | 6/2006 |

OTHER PUBLICATIONS

U.S. Appl. No. 12/117,704, filed May 8, 2008.

(Continued)

*Primary Examiner* — Khoa Huynh
*Assistant Examiner* — Brieanna Szafran
(74) *Attorney, Agent, or Firm* — McLane Middleton Professional Association

(57) ABSTRACT

Improved helmet mounting devices for an optical device are provided. The mounting devices herein include dual pivot axes providing multiple flip options for pivoting the viewing device and/or mount up and away from the user's line of sight. The dual pivot axes and multiple flip positions also allow the unit to be adapted for a variety of viewing devices.

19 Claims, 15 Drawing Sheets

(56) References Cited

U.S. PATENT DOCUMENTS

| | | |
|---|---|---|
| 5,542,627 A | 8/1996 | Crenshaw et al. |
| 5,703,354 A | 12/1997 | Wannagot et al. |
| D392,071 S | 3/1998 | Berke |
| D402,421 S | 12/1998 | Berke |
| 5,898,472 A | 4/1999 | Oshikawa |
| 5,914,816 A | 6/1999 | Soto et al. |
| 5,920,371 A | 7/1999 | Chang et al. |
| 6,457,179 B1 | 10/2002 | Prendergast |
| 6,462,867 B2 | 10/2002 | Choinere |
| 6,472,776 B1 | 10/2002 | Soto et al. |
| 6,560,029 B1 | 5/2003 | Dobbie et al. |
| 6,662,370 B1 | 12/2003 | Buchanan, Jr. |
| 6,795,977 B2 | 9/2004 | Basson et al. |
| 6,957,449 B2 | 10/2005 | Prendergast |
| 7,219,370 B1 | 5/2007 | Teetzel et al. |
| 7,722,279 B2 * | 5/2010 | Neff et al. .................. 403/13 |
| 7,735,159 B2 | 6/2010 | Prendergast |
| 8,209,780 B1 * | 7/2012 | Lemire .................. A42B 3/04 2/422 |
| 2002/0120979 A1 | 9/2002 | Prendergast |
| 2004/0156113 A1 * | 8/2004 | Buchanan, Jr. .............. 359/630 |
| 2005/0111097 A1 | 5/2005 | Iannarelli et al. |
| 2006/0174401 A1 * | 8/2006 | Prendergast .................. 2/422 |
| 2007/0114252 A1 * | 5/2007 | Gruebel et al. ................ 224/181 |
| 2007/0214551 A1 | 9/2007 | Teetzel et al. |
| 2008/0263752 A1 | 10/2008 | Solinsky et al. |
| 2010/0175172 A1 * | 7/2010 | Dempsey et al. ................ 2/422 |
| 2010/0299814 A1 | 12/2010 | Celona et al. |

OTHER PUBLICATIONS

U.S. Appl. No. 12/259,010, filed Oct. 27, 2010.
U.S. Appl. No. 12/791,063, filed Jun. 1, 2010.
U.S. Appl. No. 13/019,889, filed Feb. 2, 2011.
U.S. Appl. No. 12/951,969, filed Nov. 22, 2010.

* cited by examiner

HELMET MOUNT FOR VIEWING DEVICE

CROSS-REFERENCE TO RELATED APPLICATION

This application claims the benefit of priority under 35 U.S.C.§119(e) based on U.S. provisional application Ser. No. 61/168,789 filed Apr. 13, 2009, which is incorporated herein by reference in its entirety.

INCORPORATION BY REFERENCE

Each of the aforementioned U.S. patents and patent applications is incorporated herein by reference in its entirety: Ser. No. 12/259,010 filed Oct. 27, 2008; Ser. No. 60/982,533 filed Oct. 27, 2007; Ser. No. 12/117,704 filed May 8, 2008; Ser. No. 60/928,239 filed May 8, 2007; Ser. No. 11/804,813 filed May 21, 2007; Ser. No. 10/959,906 filed Oct. 6, 2004; U.S. Pat. No. 7,219,370 issued May 22, 2007; and Ser. No. 60/509,136 filed Oct. 6, 2003.

BACKGROUND

The present disclosure relates to an improved system for mounting an optical device to headgear such as a field helmet, and specifically, a mount with dual pivot axis for providing multiple flip options for flipping an attached optical device to a flipped or stowed position out of the user's line of sight when the optical device is not in use. The optical device may be, without limitation, a night vision device enabling viewing under nighttime or other low light conditions, such as night vision goggles (NVG) or electronic night vision goggles (eNVG), night vision binoculars, night vision monocular devices, etc.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
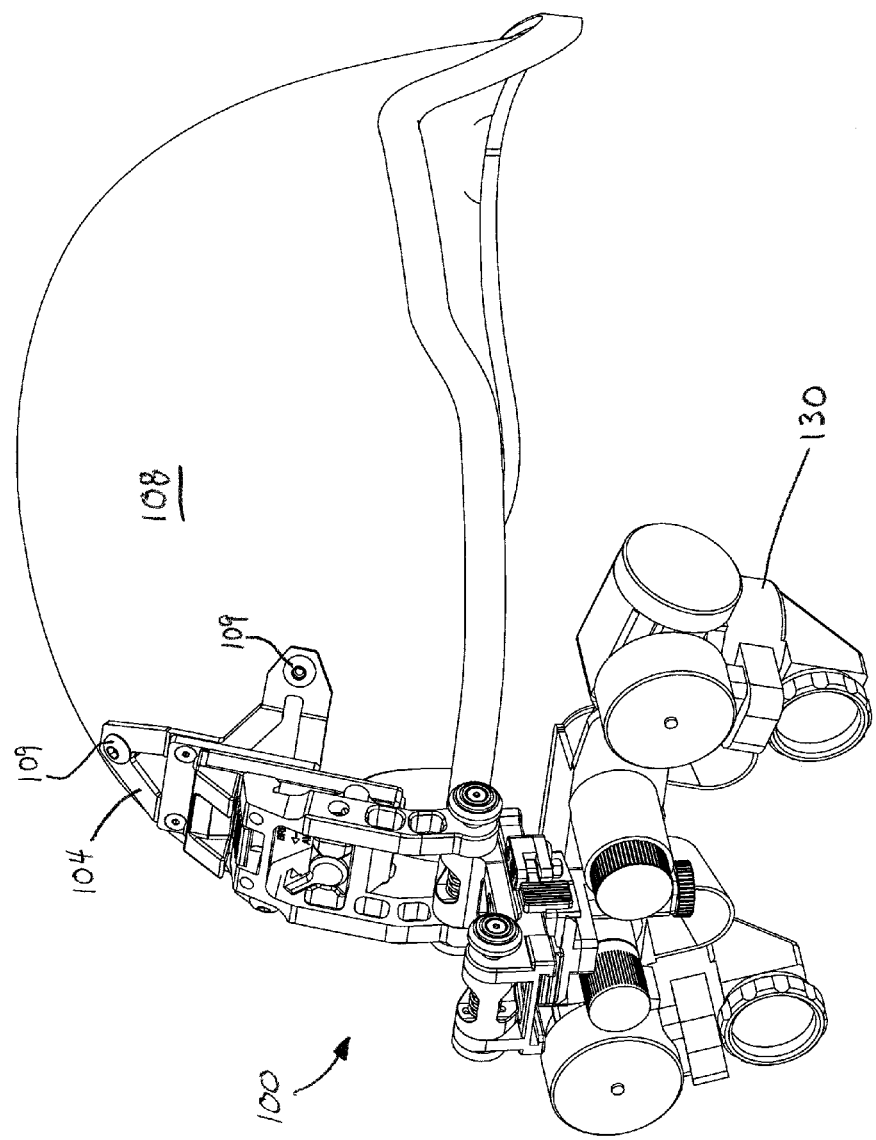
FIG. 1 is an isometric view taken generally from the front and side of an associated helmet carrying an associated optical device using a helmet mount system according to a first exemplary embodiment, wherein the optical device is positioned in front of the eyes of the user.

Referring now to the drawing FIGS. 1-9, wherein like reference numerals refer to like or analogous components throughout the several views, there appears an exemplary helmet mounting system embodiment 100, which includes a bracket 104 attached to the front portion of a helmet 108. The exemplary bracket 104 is secured to the front of the helmet 108, e.g., via a plurality of threaded fasteners 109. It will be recognized that the illustrated mounting bracket is exemplary only and other mounting brackets may be employed as well, including the flush-mount, bayonet mounting bracket as described in the aforementioned U.S. provisional application Ser. No. 60/928,239 filed May 8, 2007, or the strap mounted bracket or the track mounted bracket shown in the aforementioned U.S. Pat. No. 7,219,370.

A breakaway base 112 is secured to the mounting bracket 104. The breakaway base 112 includes a sliding plate 114 which slides vertically with respect to an interface plate 110 engaging the bracket 104, e.g., via threaded fasteners 111. Alternatively, a removable attachment mechanism may be employed, such as a bayonet-type mount, for example, a bayonet mount in which a male bayonet mount member on the breakaway base engages a complimentary bayonet plate on the bracket 104 as described in the aforementioned U.S. application Ser. No. 12/259,010.

A depressible button 118 allows the sliding plate 114 to slide with respect to the interface plate 110 to provide a vertical adjustment of an attached optical device relative to the eye of the user. Preferably, the vertical adjustment mechanism is of the gear rack/gear tooth type described in the aforementioned U.S. Pat. No. 7,219,370.

A tri-fold pivot arm assembly 116 may be secured to the breakaway base 112 in breakaway fashion. The breakaway mechanism may be a selectable breakaway/non-breakaway mechanism as described in the aforementioned commonly owned U.S. Pat. No. 7,219,370, incorporated herein by reference and as described in greater detail below.

The pivot arm assembly 116 includes a first pivoting segment 120 secured to the sliding plate 114, and a second pivoting segment 122. The second pivoting segment 122 pivots relative to the first pivoting segment 120 about a first pivot axis 124. A third pivoting segment 126 is pivotally attached to the second pivoting segment 122. The third pivoting segment 126 pivots with respect to the second pivoting segment 122 about a second pivot axis 128.

Figure 3:
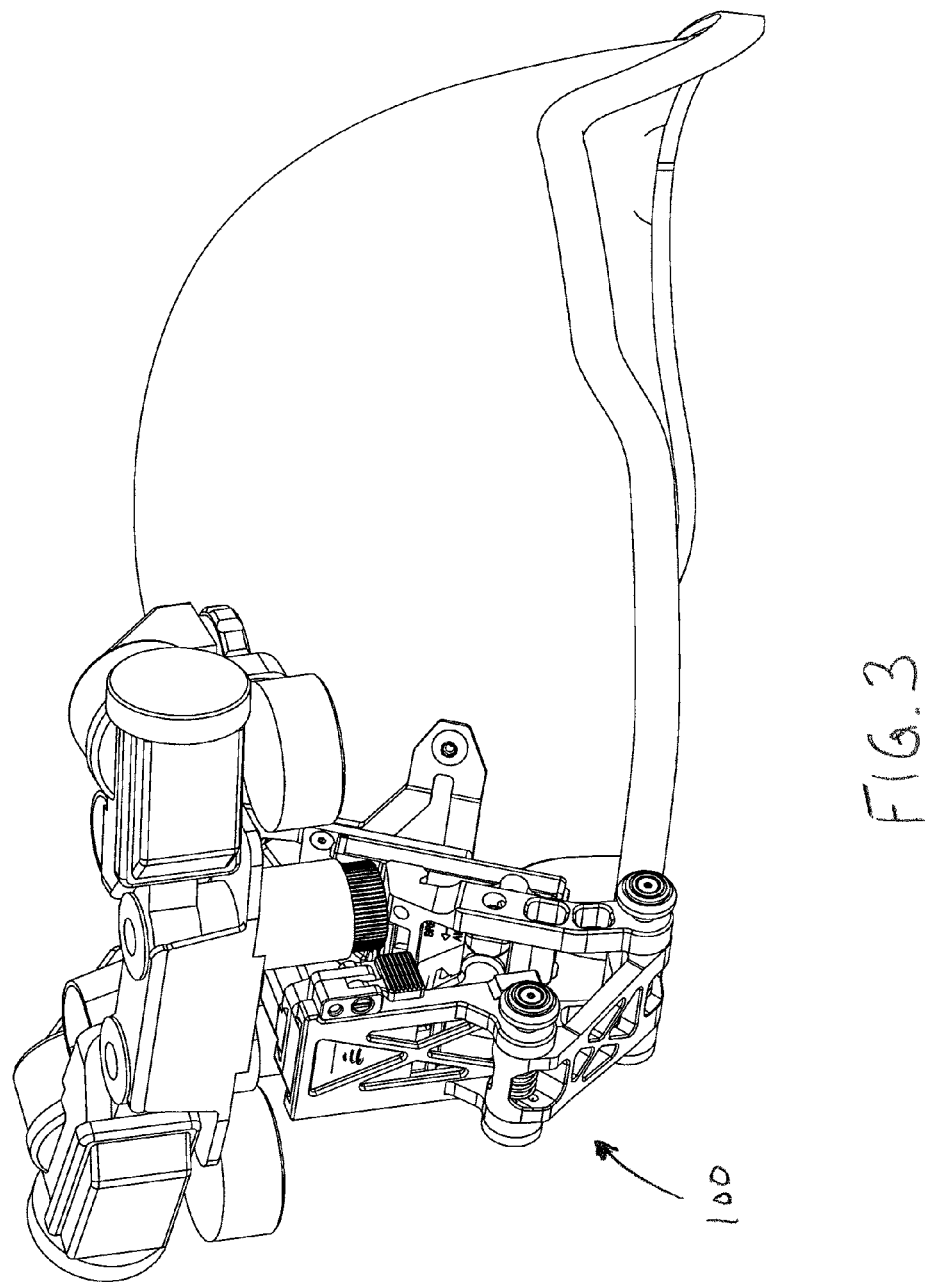
FIG. 3 is an isometric view of the embodiment appearing in FIG. 1, wherein the optical device is pivoted about first and second pivot axes to a second stowed position.
Figure 4:
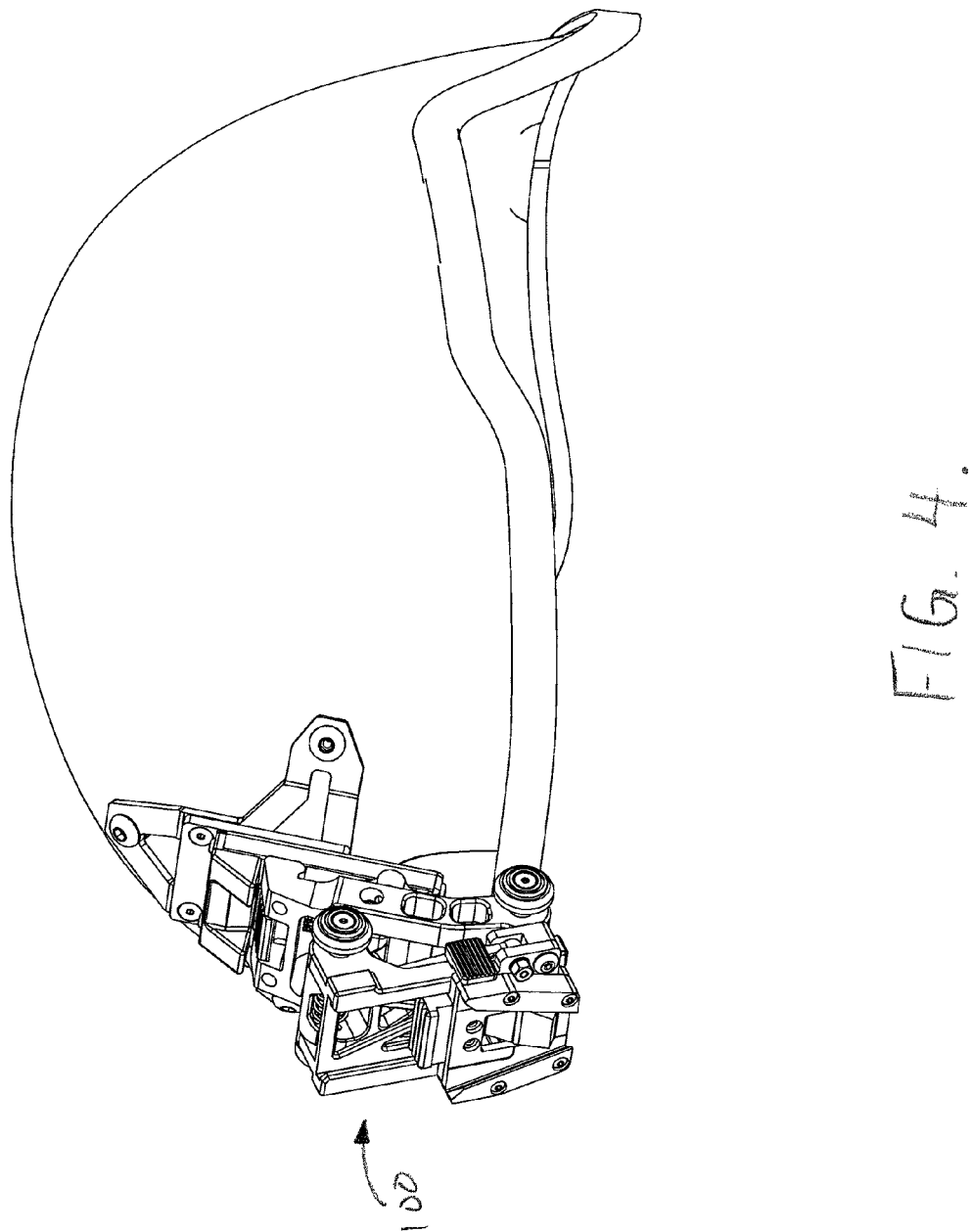
FIG. 4 is an isometric view of the embodiment appearing in FIG. 1, showing the optical device removed and the helmet mounting system in a stowed position on the helmet.

The second pivoting segment 122 is selectively pivotable with respect to the second pivoting segment 122 between a lower, operative or deployed position (see FIG. 1), an intermediate position (see FIG. 3) and a fully pivoted up position (see FIG. 4). Likewise, the third pivoting segment 126 is selectively pivotable with respect to the second pivoting segment 122 between an operative or deployed position (see FIG. 1), an intermediate position (see FIG. 3) and a fully pivoted position (see FIG. 2).

As best seen in FIG. 1, an attached optical device 130 is positioned in the deployed, viewable position when the second pivoting segment 122 is pivoted to the full down position and the third pivoting segment 126 is likewise pivoted to the full down position, that is, so that the third segment 126 is folded back along the second segment 122.

Figure 2:
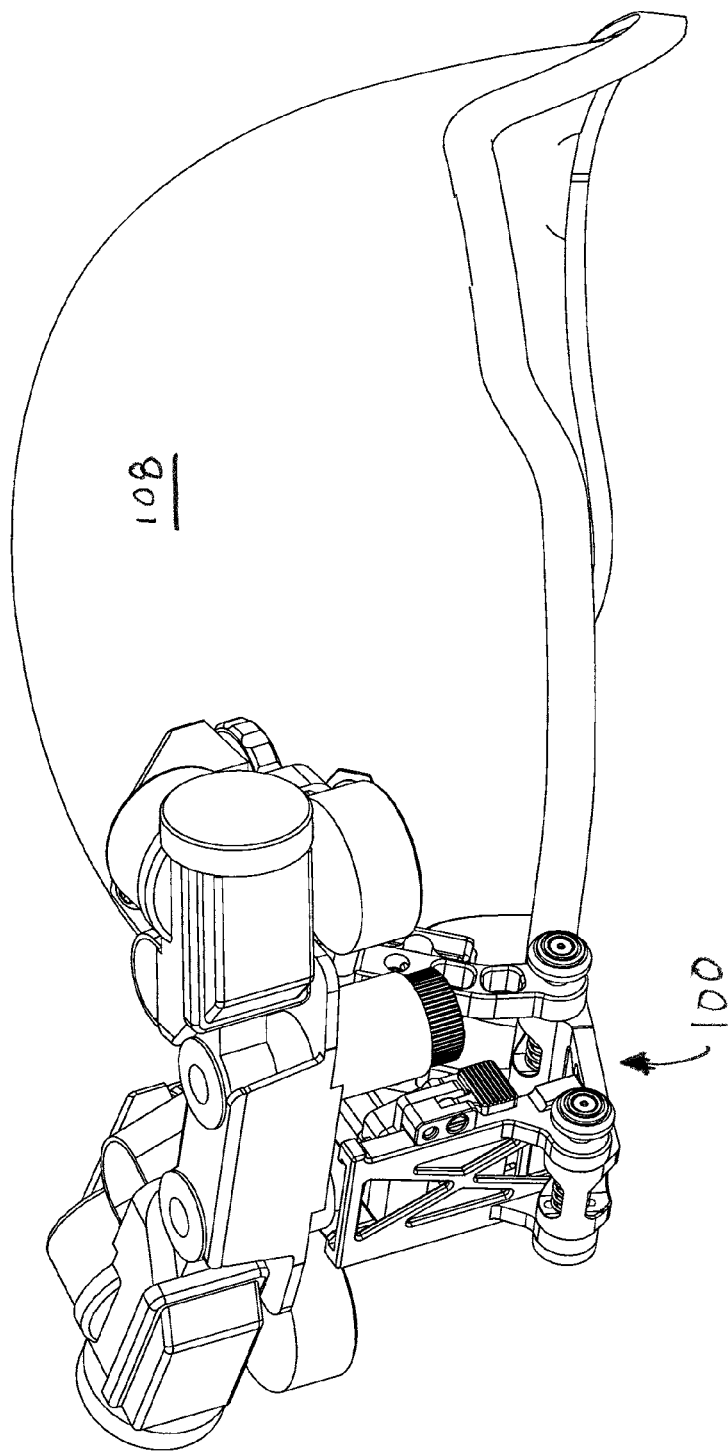
FIG. 2 is an isometric view of the embodiment appearing in FIG. 1, wherein the optical device is pivoted about a first mount pivot axis to a first stowed position.

As best seen in FIG. 2, when the attached optical device 130 is not in use, the device 130 may be moved to a first stowed position by leaving the second pivoting segment 122 in the full down position and pivoting the third pivoting segment 126 to the full up position, thereby elevating the optical device 130 above the line of sight of the user. In this manner, the optical device 130 may be selectively moved between the viewing position and a stowed position with a single action.

An alternative stowed position for the device 130 is seen in FIG. 3, wherein the second pivoting segment 122 is pivoted to the intermediate pivoted position and the third pivoting segment 126 is likewise pivoted to the intermediate position. Although moving the optical device 130 from the viewing position to this alternative stowed position requires two pivoting actions, it has the advantage of moving the device back farther toward the user and over the helmet when the optical device 130 is not in use, thus reducing neck strain. Thus, the alternative stowed position as shown in FIG. 3 is advantageous when the optical device is not in use for relatively long periods of time.

The optical device 130 may advantageously be a low profile night vision device such as the AN/PVS-21 low-profile night vision goggle (LPNVG) available from Sensor Technology Systems, Inc., of Beavercreek, Ohio. It will be recognized, however, that the present invention may be adapted for use with all manner of night vision or other optical devices. By providing three pivoting segments, the present mounting system may readily be tailored for use with other viewing devices, including those with widely varying profiles or dimensions.

As best seen in FIG. 4, the mounting system 100 may also be pivoted to yet another stowed position, wherein the second pivoting segment 122 is pivoted to the fully upward pivoted position and the third pivoting segment 126 is pivoted to the full downward position. The stowed position appearing in FIG. 4 provides compact storage of the mounting system 100 when the optical device 130 is not attached to the mount 100.

In the illustrated exemplary embodiment, the breakaway mechanism includes a breakaway lever 127, which is pivotable between a first, breakaway position and a second, non-breakaway position. When the breakaway lever 127 is in the breakaway position, the engagement between the breakaway base and the pivot arm 120 is removably detachable. That is, the pivot arm 120 will detach from the breakaway base upon the application of a predetermined force. When the lever 127 is moved to the non-breakaway position, the pivot arm 120 is rigidly attached to the breakaway base 112. The breakaway mechanism may be as described in the aforementioned U.S. Pat. No. 7,219,370.

In an exemplary embodiment, when the breakaway lever 127 is in the first, breakaway position, protrusions 131 (e.g., which may be ball bearings) captured within and extending through openings in a breakaway housing 133 on the breakaway base 112 are resiliently urged into aligned and complimentary openings or depressions 135 on the first pivoting segment 120. The resilient urging of the members 133 is caused by spring members (not shown) within the housing 133 and allows the pivot segment 120 to become detached from the breakaway base 112 upon the application of a predetermined force. When the lever 127 is moved to the nonbreakaway position, a cam surface (not shown) on the lever 127 compresses the internal spring members to compress and stack the spring coils and maintain the members 133 nonresiliently in the openings 135.

In addition to the safety benefit of having a breakaway connection between the first segment 120 and the breakaway base 112, the breakaway connection also provides a quick connect/disconnect mechanism for removing the optical device 130 from the helmet 108. It will be recognized, however, that in alternative embodiments (not shown), the breakaway mechanism may be omitted. For example, in certain embodiments, the sliding plate member 114 may be adapted to provide a hinged or pivotal connection to the second pivoting segment 122 and the interface plate 110 may be adapted for a direct connection to the helmet or an interface member on the helmet, preferably via a bayonet-type connection as described above or other quick connect/disconnect mechanism.

In the illustrated preferred embodiment, a tilt adjustment mechanism for adjusting the tilt angle of the optical device to a desired line of sight or optical axis is not included, since a tilt adjustment is included on the AN/PVS-21 LPNVG. However, a tilt angle adjustment knob (not shown) may optionally be provided to allow the tilt angle of the optical device 130 to be adjusted to a desired line of sight or optical axis where the unit 100 is intended to be used with an optical device that lacks an integrated tilt angle adjustment. The optional tilt angle adjustment mechanism may comprise, for example, a threaded knob rotatably engaging a threaded shaft running in an elongate or arcuate slot which may be selectively loosened for adjustment and then tightened when the tilt angle is at a desired position. If desired, the optional tilt angle adjustment mechanism may be as described in the aforementioned U.S. application Ser. No. 12/259,010 or U.S. Pat. No. 7,219,370.

The first pivot segment 120 includes a hinge portion 137 including openings 139. The second pivot segment 122 includes a proximal hinge portion 141 having openings 143 and a distal hinge portion 145 having openings 147. The third pivot segment 126 includes a hinge portion 149 having openings 151.

A first hinge or pivot pin 153 includes a button 155 secured to a first end thereof, e.g., via a threaded fastener 157. A spring pin 159 is received within an opening 161 in the pivot pin 153. The first hinge pin 153 lies along the first pivot axis 124.

A second hinge or pivot pin 163 includes a button 165 secured to a first end thereof, e.g., via a threaded fastener 167. A spring pin 169 is received within an opening 171 in the pivot pin 163. The second hinge pin 163 lies along the second pivot axis 128. In the depicted illustrated embodiment, the buttons 155 and 165 are on the same transverse side of the unit 100. However, in alternative embodiments, the buttons 155 and 165 may be positioned on opposite transverse sides of the unit as shown in the alternative embodiment 300, described below, so as to prevent inadvertent actuation of the button 155 or 165 when actuation of the other is intended.

The first hinge pin 153 extends through the aligned openings 139 and 143 of the respective hinge portions 137 and 141 of the first and second pivoting segments 120 and 122, respectively, thereby providing a hinged or pivoting connection therebetween.

The second hinge pin 163 extends through the aligned openings 147 and 151 of the respective hinge portions 145 and 149 of the second and third pivoting segments 122 and 126, respectively, thereby providing a hinged or pivoting connection therebetween.

A first spring 173 is received within a cavity 177 in the proximal hinge portion 141 and is coaxially received about the first hinge pin 153. A second spring 175 is received within a cavity 179 in the distal hinge portion 139 and is coaxially received about the second hinge pin 163.

A first retention disk 181 is secured to the opposite end of the first hinge pin 153 via a threaded fastener 183. Locating pins 185 are rigidly received in the respective openings 187 in the disk 181. Likewise, a second retention disk 191 is secured to the opposite end of the second hinge pin 163 via a threaded fastener 193. Locating pins 195 are rigidly received in the respective openings 197 in the disk 191.

The locating pins 185 are slidably received through openings 201 in the hinge portion 139 and slidably extend into a selected pair of complimentary openings (not shown) in the hinge portion 141. The hinge portion 141 includes three pairs of openings (not shown) angularly displaced about the axis 124, each of which corresponds to a selected angular position of the second segment 122 relative to the first segment 120. In operation, to pivot the second pivoting segment 122 relative to the first pivoting segment 120, the button 155 is manually depressed causing the pivot pin 153 to slide in the axial direction. The spring pin 159 engages the spring 173 and compresses the spring 173 when the button 155 is depressed.

As the hinge pin 153 is translated in the transverse direction along the axis 124, the locating pins 185 are disengaged from the openings (not shown) in the hinge portion 141, thereby allowing the second portion 122 to pivot freely with respect to the first portion 120. After the second portion 122 is pivoted to a desired position relative to the first portion 120 and the locating pins 185 are brought into alignment with another set of locating openings (not shown) on the hinge portion 141. The bias of the spring 173 urges the hinge pin 153 back to its original position, causing the locating pins 185 to slidingly engage the currently aligned set of openings (not shown) in the hinge portion 141, thereby maintaining the first and second pivoting segments 120 and 122 in a fixed relative angular orientation.

Similarly, the locating pins 195 are slidably received through openings 211 in the hinge portion 149 and slidably extend into a selected pair of complimentary openings (not shown) in the hinge portion 145. The hinge portion 145 includes three pairs of openings (not shown), angularly displaced about the axis 128, each of which corresponds to a selected angular position of the second segment 122 relative to the third segment 126. In operation, to pivot the third pivoting segment 126 relative to the second pivoting segment 122, the button 165 is manually depressed causing the pivot pin 163 to slide in the axial direction. The spring pin 169 engages the spring 175 and compresses the spring 175 when the button 165 is depressed.

As the hinge pin 163 is translated in the transverse direction along the axis 128, the locating pins 195 are disengaged from the openings (not shown) in the hinge portion 145, thereby allowing the third portion 126 to pivot freely with respect to the second portion 122. After the third portion 126 is pivoted to a desired position relative to the second portion 122 and the locating pins 195 are brought into alignment with another set of locating openings (not shown) on the hinge portion 145. The bias of the spring 175 urges the hinge pin 163 back to its original position, causing the locating pins 195 to slidingly engage the currently aligned set of openings (not shown) in the hinge portion 145, thereby maintaining the second and third pivoting segments 122 and 126 in a fixed relative angular orientation.

Figure 5:
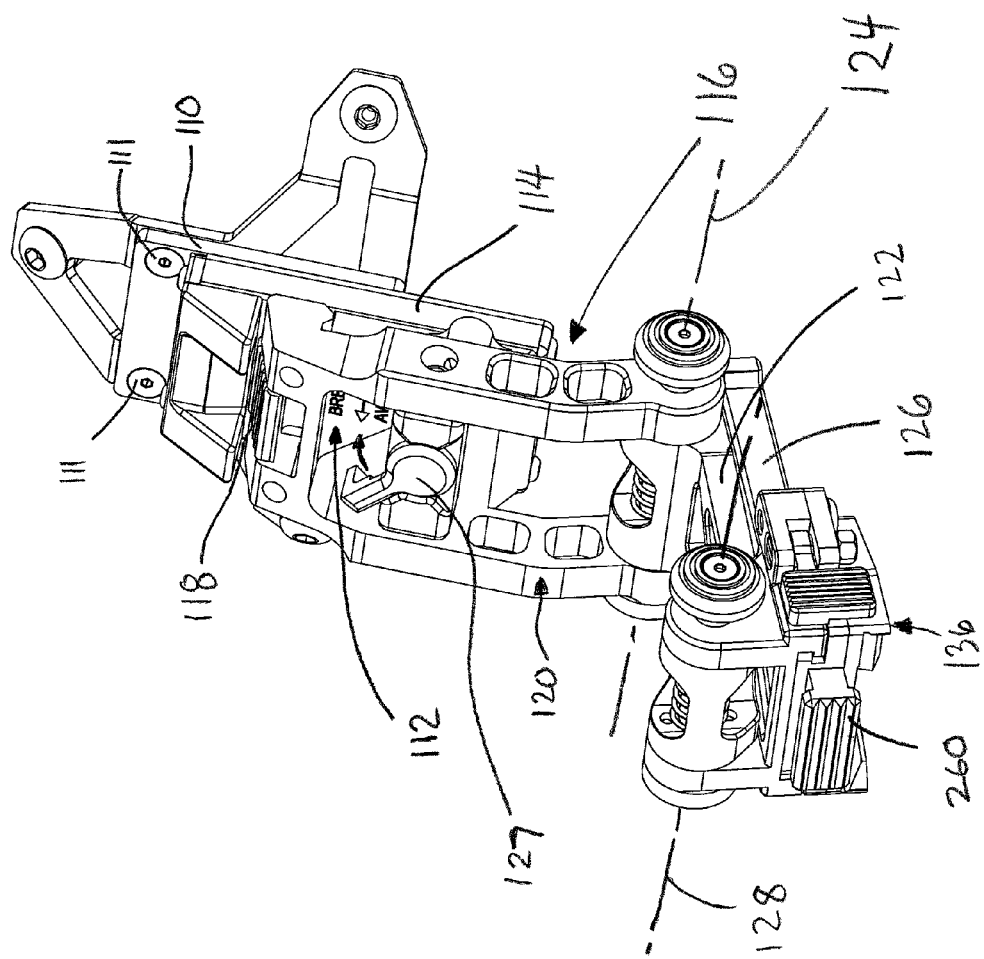
FIG. 5 is an enlarged isometric view of the helmet mount system of FIG. 1 in the deployed position with the optical device removed, wherein the optical device mounting shoe is positioned at a distal position away with respect to the user's eyes.
Figure 6:
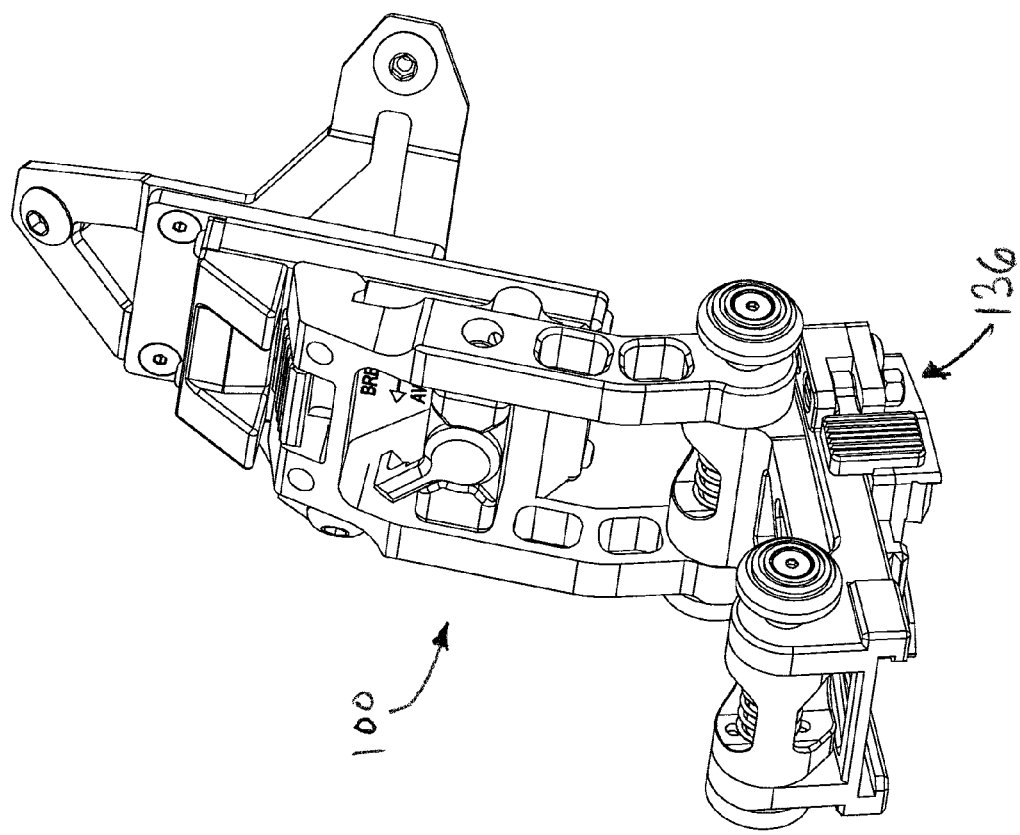
FIGS. 6 and 7 are enlarged views of the helmet mount system of FIG. 5, wherein the optical device mounting shoe is positioned at a proximal position with respect to the user's eyes.
Figure 7:
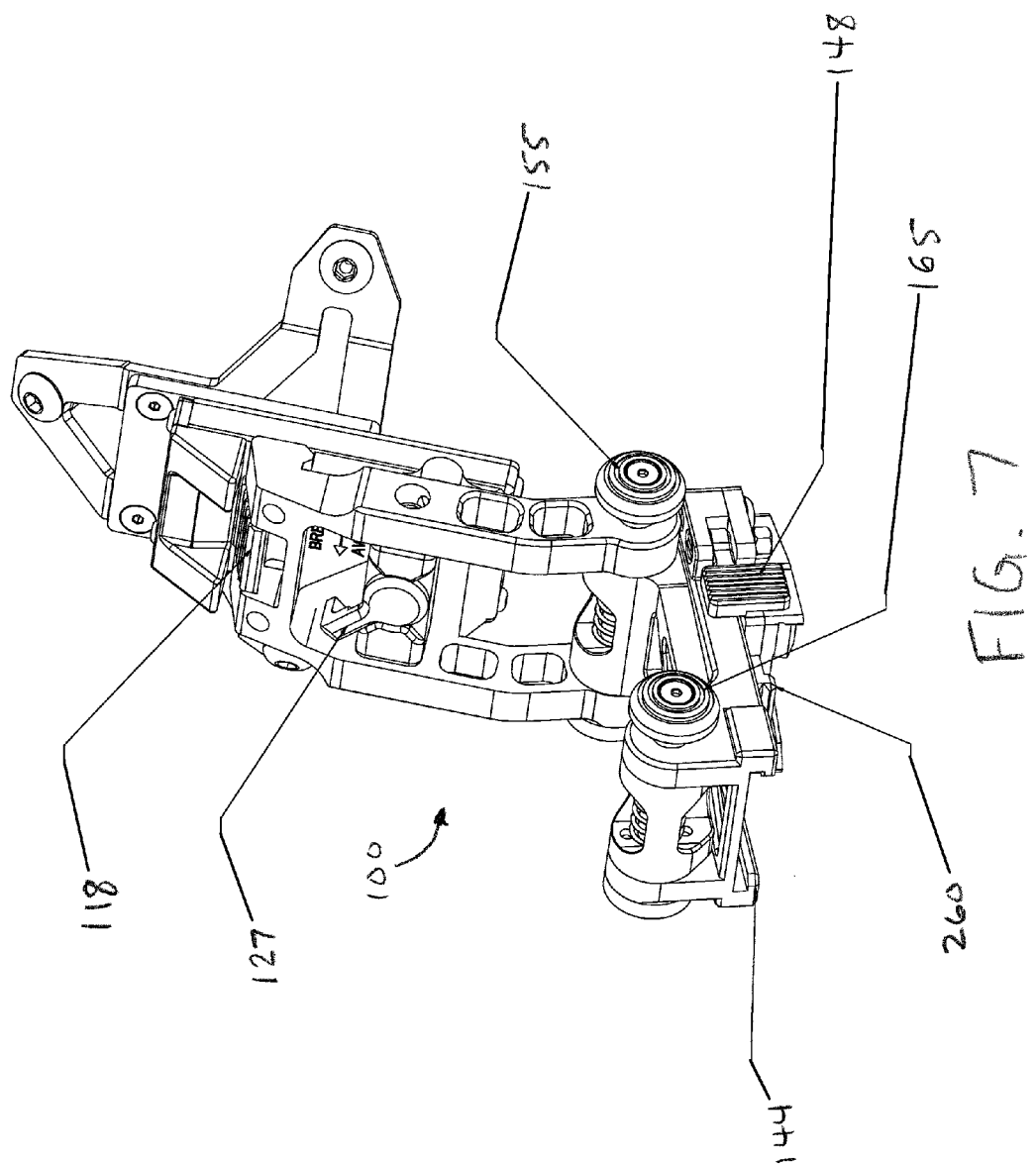
Figure 8:
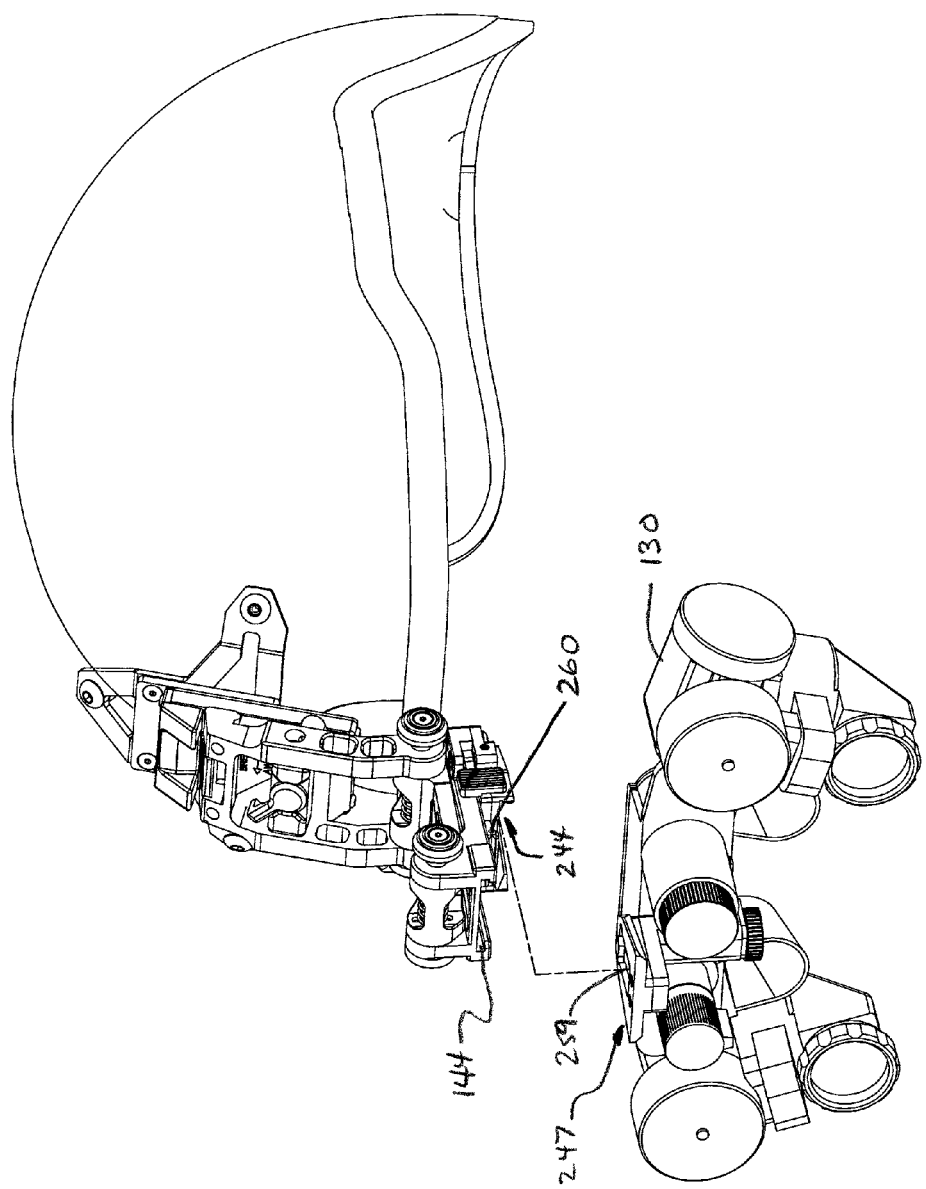
FIG. 8 is an isometric view illustrating the manner of attaching and removing the optical device.
Figure 9:
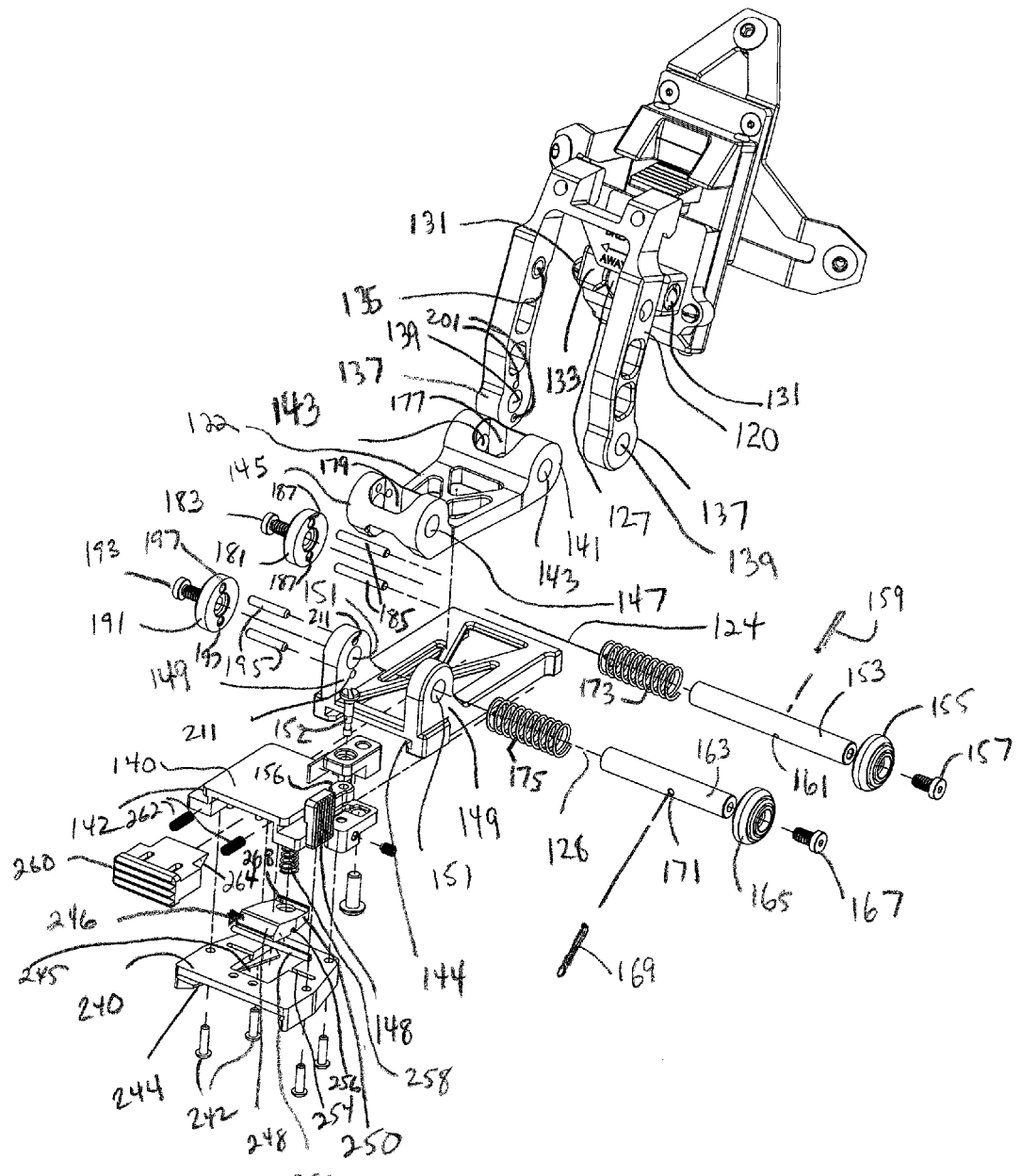
FIG. 9 is an exploded isometric view of the helmet mounting assembly appearing in FIG. 5.

A carriage assembly 136 includes a sliding body 140 having rails 142 slidably received within grooves 144 formed in third pivoting segment 126. Sliding movement of the sliding body 140 within the channels 144 provides a fore and aft adjustment mechanism for positioning the optical device at a desired distance from the user's eye. FIG. 5 shows the carriage assembly at a position furthest from the user's eye. FIG. 6 shows the carriage assembly at a position closest to the user's eye. In the depicted preferred embodiment, the fore and aft positioning is infinitely slidably adjustable therealong. A cam lever 148 is rotatably secured to the sliding body 140 and is rotatable about a pivot pin 152. The cam lever includes a cam peripheral surface 156 which exerts a force against the sidewall of the third pivoting segment 126 to secure the sliding body at a desired position along the third segment 126 when the cam lever is in the locked position. When the cam lever is in the unlocked position, the sliding body 140 slides freely along the third segment 126.

The carriage assembly also includes an optical device mounting shoe assembly 230, which includes a mounting shoe 240. The mounting shoe 240 is attached to the sliding body 140 via threaded fasteners 242. The mounting shoe 240 includes a dovetail or like receptacle 244 for removably receiving a complimentary mating mounting foot member 247 of the optical device 130. A retention member 246 is received within an opening 245 in the mounting shoe 240.

The retention member includes a forward end 248 and a rearward end 250. A pivot pin 252 is received within channels or grooves 254 on the mounting shoe 240 and extends transversely across the aperture 245 in the mounting shoe 240. The retention member 246 includes a groove 256 receiving the pin 252 to pivotally secure the retention member in the opening 245.

A spring 258 includes a first end received within an opening 268 in the rearward end 250 of the retention member 246. A second end of the spring 258 bears against the sliding body 140. In operation, the spring 258 urges the rearward end 250 into a complimentary depression or opening 259 on the mounting foot portion 247 of the optical device 130. A release button 260 is slidably received between the mounting shoe 240 and the sliding body 140. A pair of springs 262 urges the button 260 to the locked position.

In operation, to remove the optical device 130 from the mounting shoe, the button 260 is manually pressed inwardly. A ramped or inclined surface 264 on the button 260 slidingly engages the forward surface 248 of the retention member 246, urging it downward as the button 260 is depressed inward. As the retention member pivots about the pin 252, the rearward end 250 moves upward against the bias of the spring 258, thereby disengaging the complimentary receptacle 249 on the optical device 130, allowing the optical unit 130 to be removed.

Referring now to FIGS. 10-15, wherein like reference numerals refer to like or analogous components throughout the several views, there appears an exemplary helmet mounting system embodiment 300, which includes a bracket 304 attached to the front portion of a helmet 108. The exemplary bracket 304 is secured to the front of the helmet 108, e.g., via a plurality of threaded fasteners 309. It will be recognized that the illustrated mounting bracket is exemplary only and other mounting brackets may be employed as well, including the flush-mount, bayonet mounting bracket as described in the aforementioned U.S. provisional application Ser. No. 60/928,239 filed May 8, 2007, or the strap mounted bracket or the track mounted bracket shown in the aforementioned U.S. Pat. No. 7,219,370.

A breakaway base 312 is secured to the mounting bracket 304. The breakaway base 312 includes a sliding plate 314 which slides vertically with respect to an interface plate 310 engaging the breakaway base 312, e.g., via threaded fasteners 311.

A pivoting lever 318 allows the sliding plate 314 to slide with respect to the interface plate 310 to provide a vertical adjustment of an attached optical device relative to the eye of the user. The lever 318 rotates between a locked position, wherein the sliding plate 314 is fixed relative to the interface plate 310, and an unlocked position, wherein the sliding plate 314 is free to travel up and down vertically relative to the interface plate 310. The lever 318 is connected to a lock 402 having a T-shaped cross-sectional shape via a threaded fastener 404. The lock 402 engages and disengages from a track 406 via of the lever 318. A wave spring 408, preferably a heavy-duty wave spring, is located under the lever 318, which applies enough pressure to keep the sliding plate 314 locked in a fixed vertical position when the lever is in the locked position. The T shaped lock has ramps on the leading edges so that when the lever 318 is rotated, the ramps engage the T track 406 first and compress the wave spring 408 as the lever is rotated to the locked position.

Figure 15:
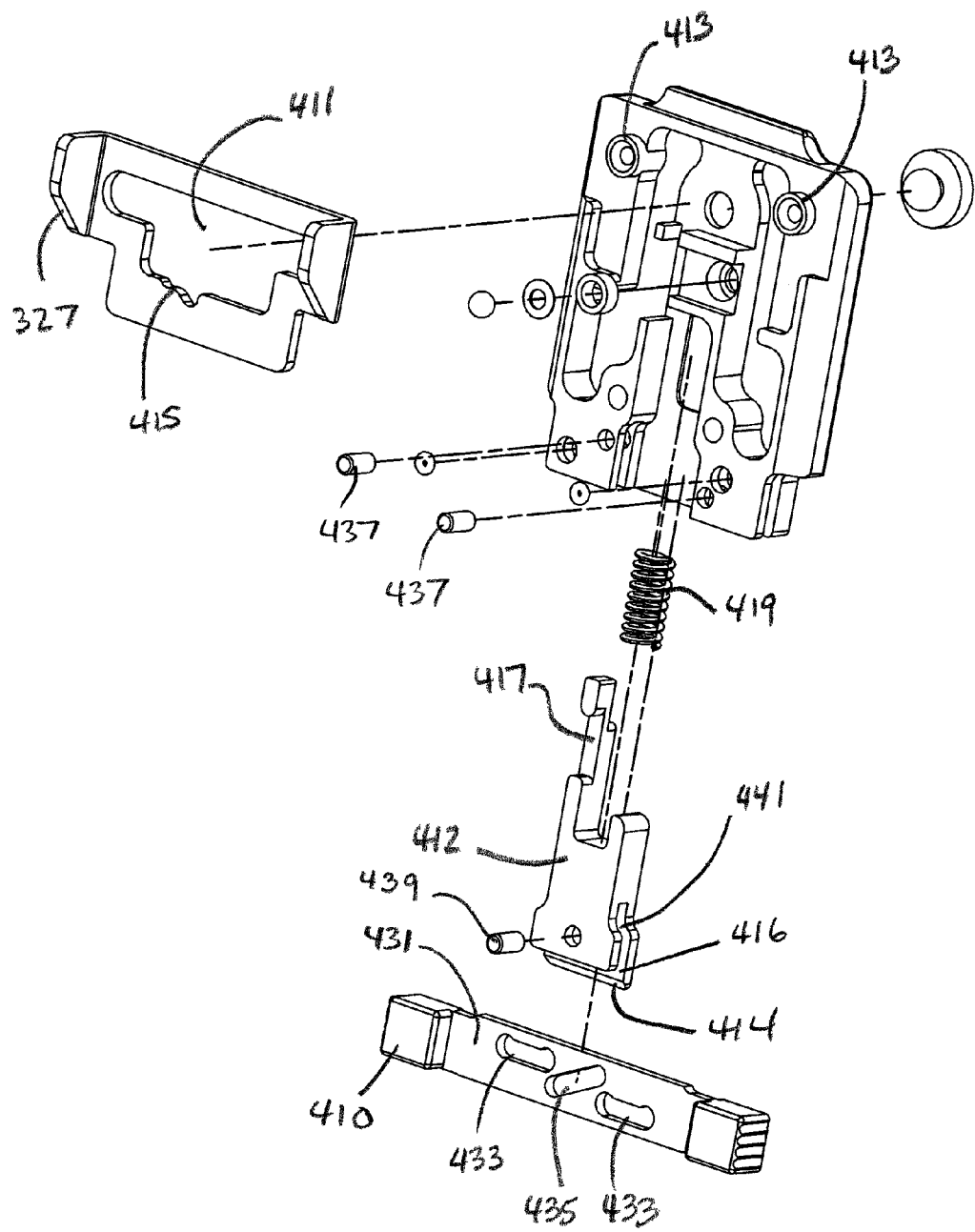
FIG. 15 is an exploded view illustrating the release and breakaway mechanisms.

As best seen in FIG. 15, a mount assembly 300 may be secured to the bracket 304 in breakaway fashion. The breakaway feature works by pressing the breakaway button 327 to the right (relative to the user) when the mount is installed on the helmet and the serrated release button 410 is pushed all the way to the right. The breakaway button includes an elongate, transverse opening 411 receiving pins 413. The opening 411 includes a stepped profile 415 engaging a notch 417 in a locking tongue member 412.

By pushing the breakaway button 327 to the right, the stepped profile 415 raises the locking tongue 412 to a "half way" point and holds it there against the urging of a biasing spring 419. By holding it at the half way point, the locking tongue 412 is now positioned so that a small inclined or ramped surface 414 is engaged on the locking surface of the bracket 304 (not shown) instead of the flat surface portion 416 of the locking tongue 412 as is the case when the breakaway button 327 is moved to the left. With the ramp 414 engaged on the mating surface of the bracket, the mount can be broken away from the helmet by an impact or application of force in the generally upward direction.

The release buttons 410 are adjoined by a slider 431 engaging a slot 441 in the tongue 412. The slider 431 having first and second elongate openings 433 and an angled elongate slot 435. Pins 437 affixed to the base 312 run in the respective slots 433. Pin 439 in the tongue 412 runs in the angled slot 435 to selectively raise and lower the tongue 412 when the slider 431 is moved side to side. To remove the mount 300 from the helmet 108, the slider is moved to the left, which moves the tongue 412 upward to disengage the tongue 412 from the complimentary depression or receptacle (not shown) on the bracket 304.

The pivot arm assembly includes the sliding plate 314, which defines the first pivoting segment, and which is pivotally attached to a second pivoting segment 326. The second pivoting segment 322 pivots relative to the first pivoting segment 314 about a first pivot axis 324. A third pivoting segment 326 is pivotally attached to the second pivoting segment 322. The third pivoting segment 326 pivots with respect to the second pivoting segment 322 about a second pivot axis 328.

Figure 12:
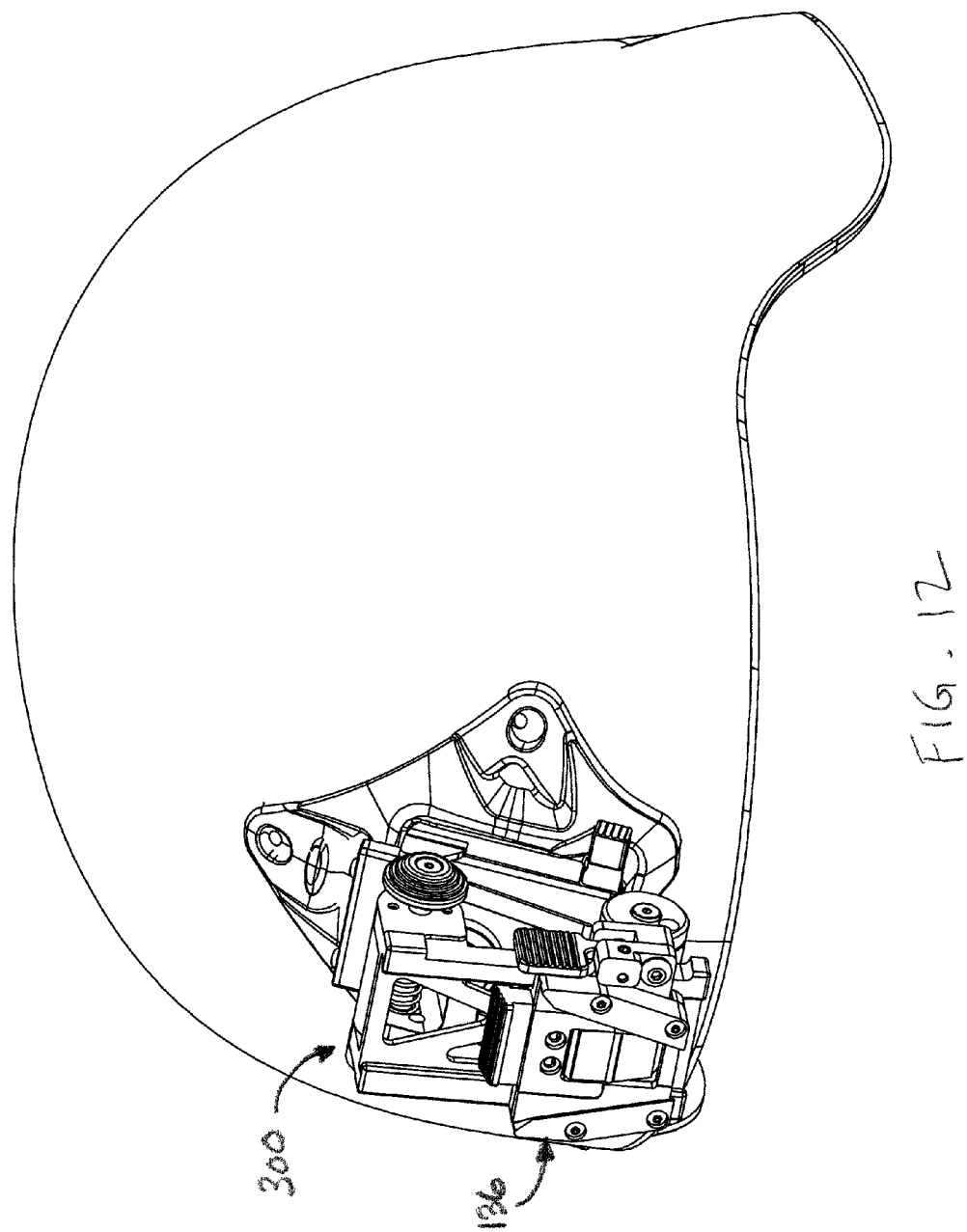
FIG. 12 illustrates the mount appearing in FIG. 10 in a stored position.

The second pivoting segment 322 is selectively pivotable with respect to the first pivoting segment 314 between a lower, operative or deployed position (see FIG. 10) and a fully pivoted up or stored position (see FIG. 12). Likewise, the third pivoting segment 326 is selectively pivotable with respect to the second pivoting segment 322 between an operative or deployed position (see FIG. 10), a flipped-up position (see FIG. 13).

Figure 10:
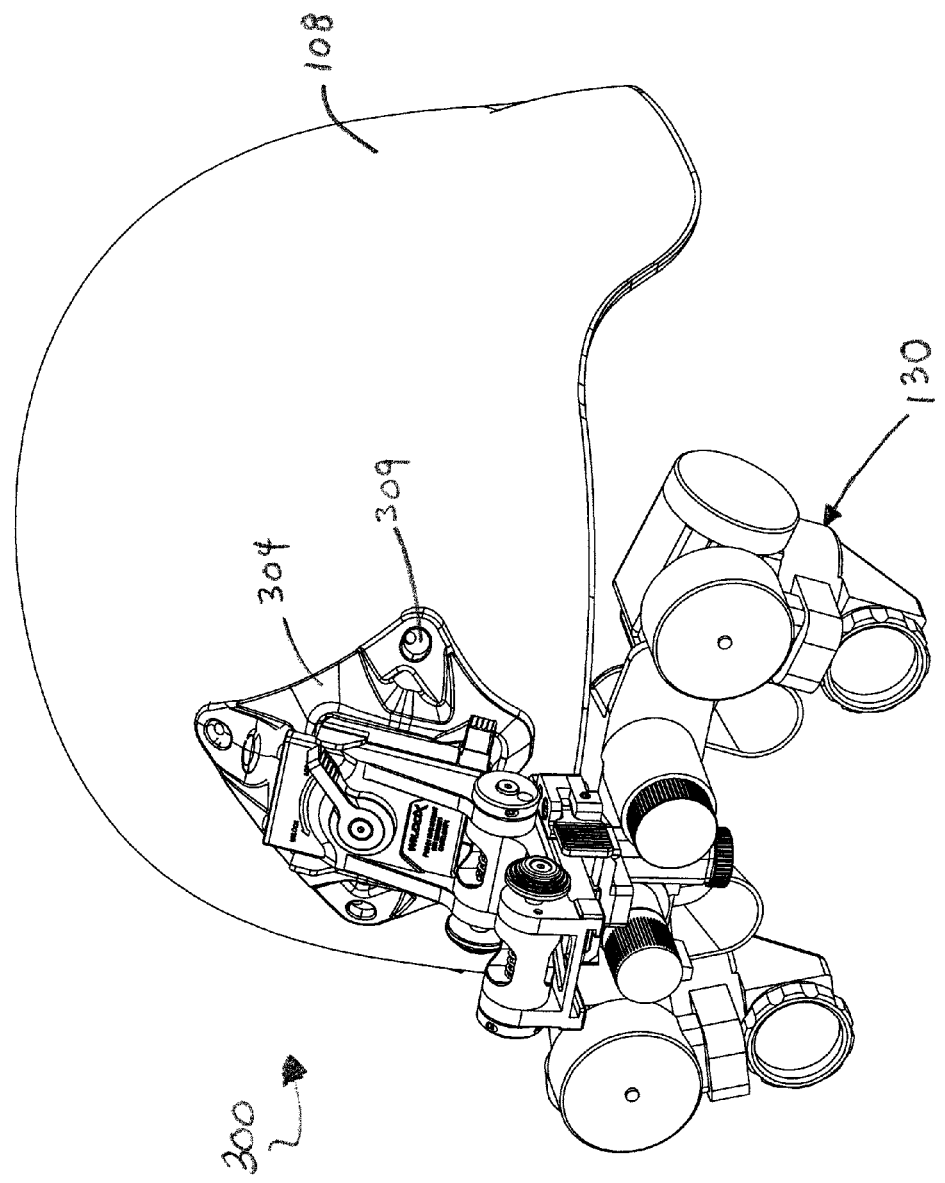
FIG. 10 is an isometric view of a second embodiment helmet mounting system.
Figure 11:
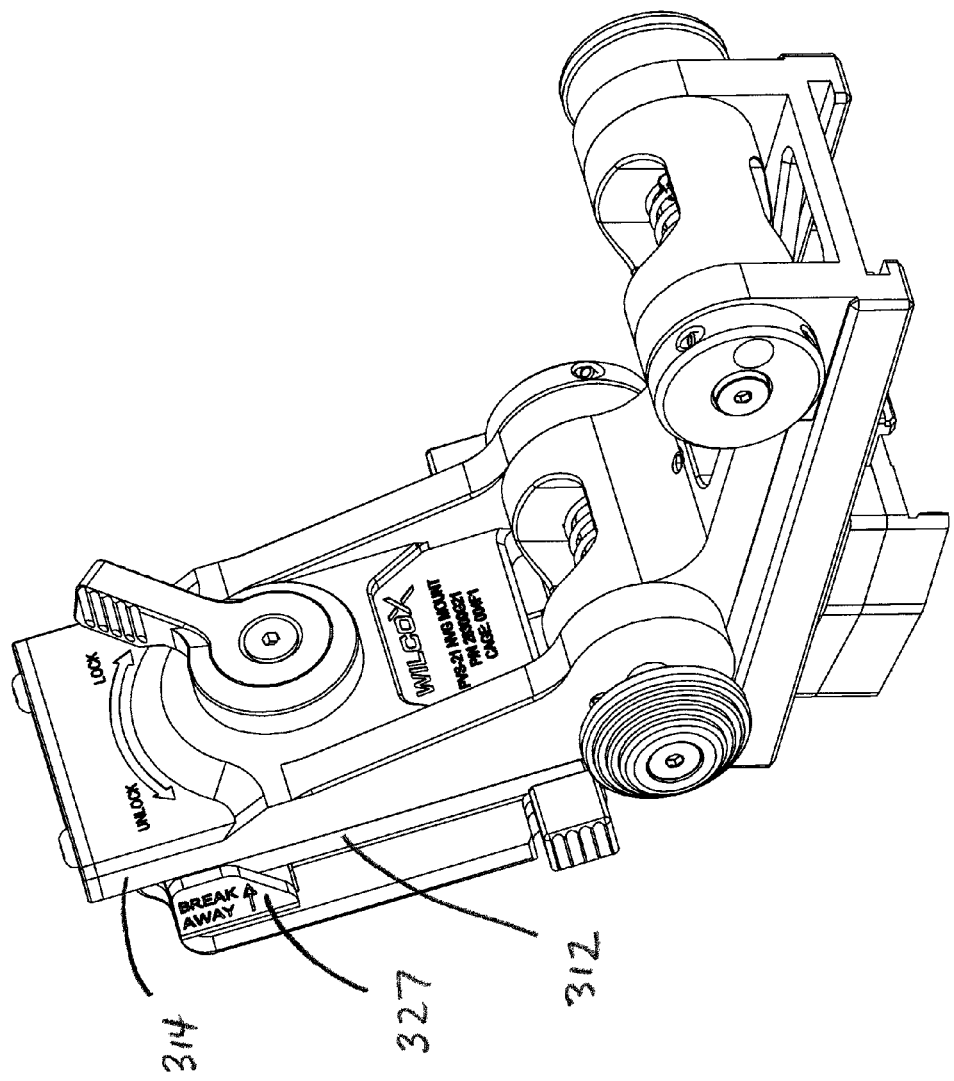
FIG. 11 is an enlarged view of the mount appearing in FIG. 10.

As best seen in FIG. 10, an attached optical device 130 is positioned in the deployed, viewable position when the second pivoting segment 322 is pivoted to the down position and the third pivoting segment 326 is likewise pivoted to the down position, that is, so that the third segment 326 is folded back along the second segment 322.

As best seen in FIG. 12, when the attached optical device 130 is not in use, the device 130 may be moved to a stowed position, wherein the second pivoting segment 322 is pivoted to the upper pivoted position and the third pivoting segment 326 is in the deployed, folded back position. The stowed position appearing in FIG. 12 provides compact storage of the mounting system 300 when the optical device 130 is not attached to the mount 300.

The optical device 130 may advantageously be a low profile night vision device as described above. Again, other viewing device configurations are contemplated and by providing three pivoting segments, the mounting system 300 may readily be tailored for use with other viewing devices, including those with widely varying profiles or dimensions.

Figure 13:
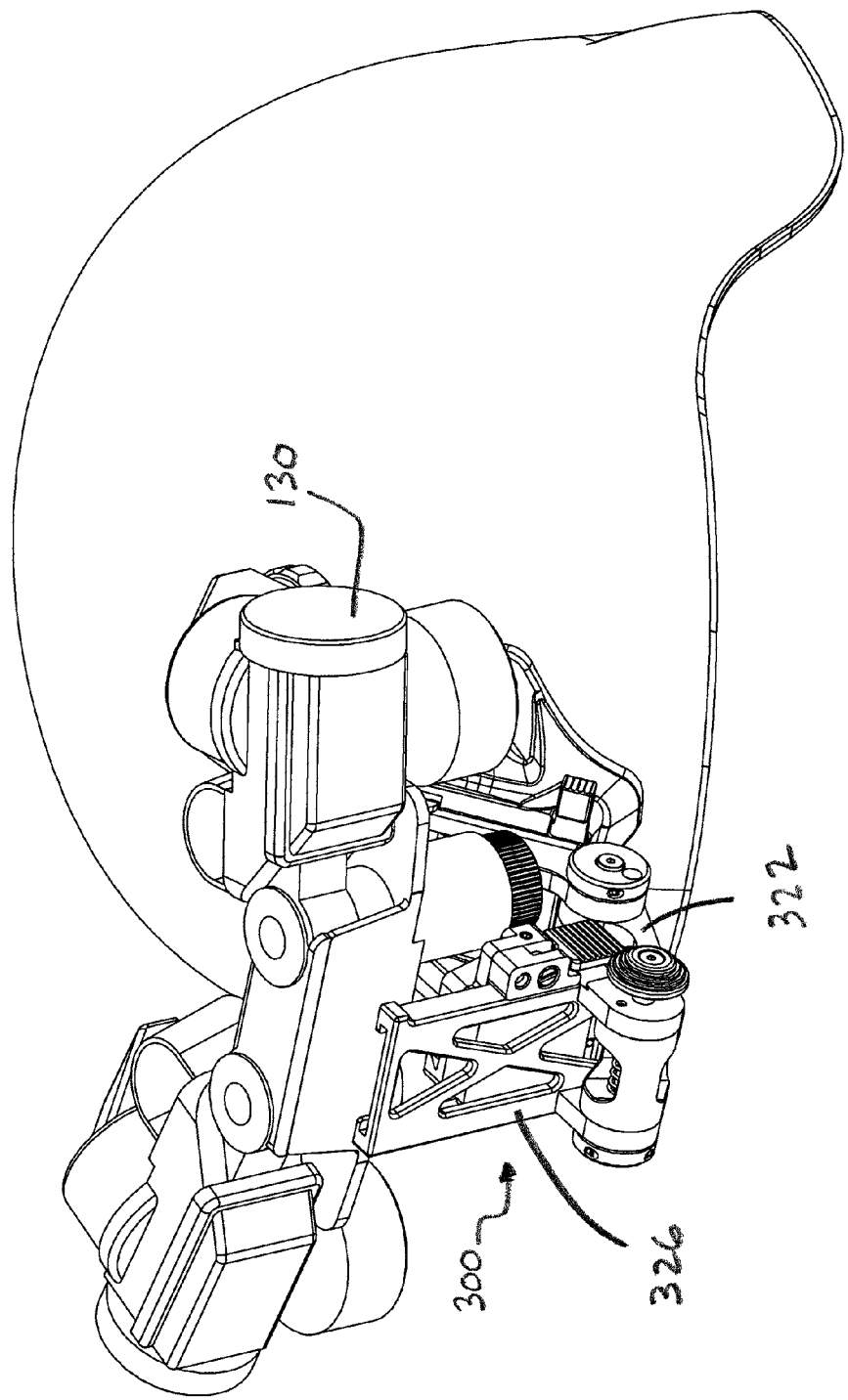
FIG. 13 illustrates the mount appearing in FIG. 10 with the optical device in a flipped up position.
Figure 14:
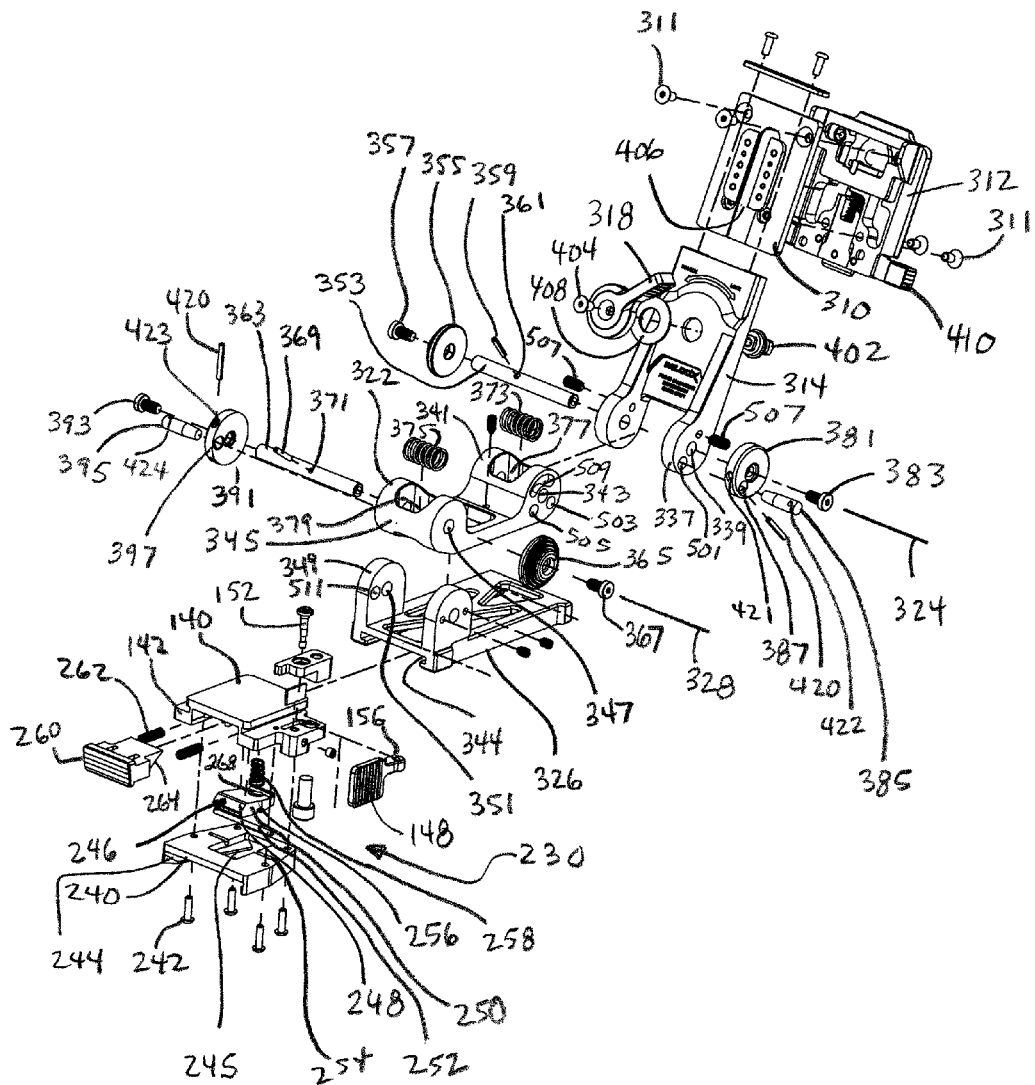
FIG. 14 is an exploded view of the mount appearing in FIG. 10.

As best seen in FIG. 13, the mounting system 300 may also be pivoted to another stowed position, wherein the second pivoting segment 322 remains in the deployed position and the third pivoting segment 326 is pivoted to the upward position. Optionally, an intermediate pivot position between the first and second pivoting segments may also be provided as described above.

In the illustrated preferred embodiment 300, a tilt adjustment mechanism for adjusting the tilt angle of the optical device to a desired line of sight or optical axis is not included, since a tilt adjustment is included on the AN/PVS-21 LPNVG. However, a tilt angle adjustment knob (not shown) may optionally be provided to allow the tilt angle of the optical device 130 to be adjusted to a desired line of sight or optical axis where the unit 300 is intended to be used with an optical device that lacks an integrated tilt angle adjustment. The optional tilt angle adjustment mechanism may comprise, for example, a threaded knob rotatably engaging a threaded shaft running in an elongate or arcuate slot which may be selectively loosened for adjustment and then tightened when the tilt angle is at a desired position. If desired, the optional tilt angle adjustment mechanism may be as described in the aforementioned U.S. application Ser. No. 12/259,010 or U.S. Pat. No. 7,219,370.

The first pivot segment 314 includes a hinge portion 337 including openings 339. The second pivot segment 322 includes a proximal hinge portion 341 having openings 343 and a distal hinge portion 345 having openings 347. The third pivot segment 326 includes a hinge portion 349 having openings 351.

A first hinge or pivot pin 353 includes a button 355 secured to a first end thereof, e.g., via a threaded fastener 357. A spring pin 359 is received within an opening 361 in the pivot pin 353. The first hinge pin 353 lies along the first pivot axis 324.

A second hinge or pivot pin 363 includes a button 365 secured to a first end thereof, e.g., via a threaded fastener 367. A spring pin 369 is received within an opening 371 in the pivot pin 363. The second hinge pin 363 lies along the second pivot axis 328. In the depicted embodiment, the buttons 355 and 365 are on opposite transverse sides of the unit 300 to reduce the possibility of inadvertently actuating one of the buttons 355 or 365 when actuation of the other is intended.

The first hinge pin 353 extends through the aligned openings 339 and 343 of the respective hinge portions 337 and 341 of the first and second pivoting segments 314 and 322, respectively, thereby providing a hinged or pivoting connection therebetween.

The second hinge pin 363 extends through the aligned openings 347 and 351 of the respective hinge portions 345 and 349 of the second and third pivoting segments 322 and 326, respectively, thereby providing a hinged or pivoting connection therebetween.

A first spring 373 is received within a cavity 377 in the proximal hinge portion 341 and is coaxially received about the first hinge pin 353. A second spring 375 is received within a cavity 379 in the distal hinge portion 339 and is coaxially received about the second hinge pin 363.

A first retention disk 381 is secured to the opposite end of the first hinge pin 353 via a threaded fastener 383. A locating pin 385 is rigidly received in the openings 387 in the disk 381, e.g., secured via retaining pin 420 engaging aligned openings 421 and 422 in the retaining disk 381 and pin 385, respectively. Likewise, a second retention disk 391 is secured to the opposite end of the second hinge pin 363 via a threaded fastener 393. A locating pin 395 is rigidly received in the openings 397 in the disk 391, e.g., secured via retaining pin 420 engaging aligned openings 423 and 424 in the retaining disk 391 and pin 395, respectively.

The locating pin 385 is slidably received through opening 501 in the hinge portion 339 and slidably extends into a selected one of complimentary openings 503 and 505 in the hinge portion 341, depending on the desired pivot position. Pins 507 ride in acruate slots 509 as the second pivot segment 322 is pivoted relative to the segment 314 when the button 355 is actuated. In operation, to pivot the second pivoting segment 314 relative to the first pivoting segment 320, the button 355 is manually depressed causing the pivot pin 353 to slide in the axial direction. The spring pin 359 engages the spring 373 and compresses the spring 373 when the button 355 is depressed.

As the hinge pin 353 is translated in the transverse direction along the axis 324, the locating pin 385 is disengaged from the opening 503 or 505, as applicable depending on initial position, in the hinge portion 341, thereby allowing the second portion 322 to pivot with respect to the first portion 314. After the second portion 322 is pivoted to the desired position relative to the first portion 320 and the locating pin 385 are brought into alignment with the other one of locating openings 503, 505, on the hinge portion 341. The bias of the spring 373 urges the hinge pin 353 back to its original position, causing the locating pins 385 to slidingly engage the currently aligned opening 503 or 505 in the hinge portion 341, thereby maintaining the first and second pivoting segments 314 and 322 in a fixed relative angular orientation.

Similarly, the locating pin 395 is slidably received through a selected one of angularly displaced openings (not shown) formed on the hinge portion 349 and slidably extends into an opening 511 in the hinge portion 345. The hinge portion 345 includes two openings (not shown), angularly displaced about the axis 328, each of which corresponds to a selected angular position of the second segment 322 relative to the third segment 326. In operation, to pivot the third pivoting segment 326 relative to the second pivoting segment 322, the button 365 is manually depressed causing the pivot pin 363 to slide in the axial direction. The spring pin 369 engages the spring 375 and compresses the spring 375 when the button 365 is depressed.

As the hinge pin 363 is translated in the transverse direction along the axis 328, the locating pin 395 is disengaged from the corresponding aligned opening (not shown) in the hinge portion 345, thereby allowing the third portion 326 to pivot freely with respect to the second portion 322. After the third portion 326 is pivoted to the desired position relative to the second portion 322 the locating pin 395 is brought into alignment with the other locating opening (not shown) on the hinge portion 345. The bias of the spring 375 urges the hinge pin 363 back to its original position, causing the locating pin 395 to slidingly engage the currently aligned one of the angularly displaced openings (not shown) in the hinge portion 345, thereby maintaining the second and third pivoting segments 322 and 326 in a fixed relative angular orientation as the desired position.

A carriage assembly 136 includes a sliding body 140 having rails 142 slidably received within grooves 344 formed in the third pivoting segment 326. Sliding movement of the sliding body 140 within the channels 344 provides a fore and aft adjustment mechanism for positioning the optical device at a desired distance from the user's eyes. In the depicted preferred embodiment, the fore and aft positioning is infinitely slidably adjustable therealong. A cam lever 148 is rotatably secured to the sliding body 140 and is rotatable about a pivot pin 152. The cam lever includes a cam peripheral surface 156 which exerts a force against the sidewall of the third pivoting segment 326 to secure the sliding body at a desired position along the third segment 326 when the cam lever is in the locked position. When the cam lever is in the unlocked position, the sliding body 140 slides freely along the third segment 326.

The carriage assembly also includes an optical device mounting shoe assembly 230, which includes a mounting shoe 240. The mounting shoe 240 is attached to the sliding body 140 via threaded fasteners 242. The mounting shoe 240 includes a dovetail or like receptacle 244 for removably receiving a complimentary mating mounting foot member 247 (see FIG. 8) of the optical device 130. A retention member 246 is received within an opening 245 in the mounting shoe 240.

The retention member includes a forward end 248 and a rearward end 250. A pivot pin 252 is received within channels or grooves 254 on the mounting shoe 240 and extends transversely across the aperture 245 in the mounting shoe 240. The retention member 246 includes a groove 256 receiving the pin 252 to pivotally secure the retention member in the opening 245.

A spring 258 includes a first end received within an opening 268 in the rearward end 250 of the retention member 246. A second end of the spring 258 bears against the sliding body 140. In operation, the spring 258 urges the rearward end 250 into a complimentary depression or opening 259 (see FIG. 8) on the mounting foot portion 247 of the optical device 130. A release button 260 is slidably received between the mounting shoe 240 and the sliding body 140. A pair of springs 262 urges the button 260 to the locked position.

In operation, to remove the optical device 130 from the mounting shoe, the button 260 is manually pressed inwardly. A ramped or inclined surface 264 on the button 260 slidingly engages the forward surface 248 of the retention member 246, urging it downward as the button 260 is depressed inward. As the retention member pivots about the pin 252, the rearward end 250 moves upward against the bias of the spring 258, thereby disengaging the complimentary receptacle (259, see FIG. 8) on the optical device 130, allowing the optical unit 130 to be removed.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims.

Having thus described the preferred embodiments, the invention is now claimed to be:

1. A mounting device for mounting an optical device on a helmet, said mounting device comprising:
   a first pivot arm assembly removably attachable to the helmet;
   a second pivot arm assembly having a first end pivotally attached to said first pivot arm assembly and a second end opposite the first end, said second pivot arm assembly rotatable relative to the first pivot arm assembly about a first generally horizontal axis;
   a third pivot arm assembly pivotally attached to the second end of said second pivot arm assembly, said third pivot arm assembly rotatable relative to the second pivot arm assembly about a second generally horizontal axis, said third pivot arm assembly rotatable about said second generally horizontal axis between a first, deployed position wherein the optical device is positioned before an eye of a user and a second, stowed position wherein the optical device is positioned above a line of sight of the user; and
   an optical device mounting member attached to said third pivot arm assembly, said optical device mounting member removably attachable to the optical device.

2. The mounting device of claim 1, wherein said first pivot arm assembly is slidably attached to the helmet for providing a generally vertical adjustment of the optical device when the mounting device is in an operational position.

3. The mounting device of claim 1, further comprising:
   a bracket attached to the helmet; and
   said first pivot arm assembly slidably attached to said bracket.

4. The mounting device of claim 3, further comprising:
   a sliding interface between said bracket and said first pivot arm assembly.

5. The mounting device of claim 1, wherein said optical device mounting member is slidably attached to said third pivot arm assembly for providing a generally horizontal adjustment of the optical device when the mounting device is in an operational position.

6. The mounting device of claim 1, wherein said second pivot arm assembly rotates between a first, deployed position and a second, stowed position.

7. The mounting device of claim 6, further comprising:
   a fastener for securing the second pivot arm assembly at a third position intermediate the first, deployed position and the second, stowed position.

8. The mounting device of claim 6, wherein the mounting device is in an operational position when the second pivot arm assembly is in the first, deployed position and the third pivot arm assembly is in the first, deployed position.

9. The mounting device of claim 6, wherein the mounting device is in a stowed position when the second pivot arm assembly is in the first, deployed position and the third pivot arm assembly is in a second, stowed position.

10. The mounting device of claim 6, wherein the mounting device is in a stowed position when the second pivot arm assembly is in the second, stowed position and the third pivot arm assembly is in the first, deployed position.

11. The mounting device of claim 1, further comprising:
    a first locking member for securing the first pivot arm assembly and the second pivot arm assembly in fixed relative position;
    a second locking member for securing the second pivot arm assembly and the third pivot arm assembly in fixed relative position;
    a first push button for selectively disengaging said first locking member to permit relative rotation between the first pivot arm assembly and the second pivot arm assembly; and
    a second push button for selectively disengaging said second locking member to permit relative rotation between the second pivot arm assembly and the third pivot arm assembly.

12. The mounting device of claim 11, wherein the first push button and the second push button are on thea same transverse side of the mounting device.

13. The mounting device of claim 11, wherein the first push button and the second push button are on opposite transverse sides of the mounting device.

14. The mounting device of claim 1, further comprising:
    a tilt adjustment mechanism for adjusting a tilt position of the associated optical device relative to an eye of a user.

15. The mounting device of claim 1, further comprising:
    said first pivot arm assembly including a breakaway connector for securing the mounting device to the helmet, said breakaway connector configured to release upon application of a predetermined force.

16. The mounting device of claim 15, further comprising:
    said breakaway connector selectively configurable between a breakaway configuration wherein the breakaway connector is configured to release upon application of a predetermined force, and a nonbreakaway configuration wherein the breakaway connector rigidly secures said first pivot arm assembly to the helmet.

17. The mounting device of claim 1, further comprising:
    said optical device mounting member including a mounting shoe for removably receiving a complimentary mounting foot of the optical device.

18. The mounting device of claim 1, wherein the optical device is selected from a night vision goggle device, an electronic night vision goggle device, a night vision binocular device, and a night vision monocular device.

19. The mounting device of claim 1, wherein said third pivot arm assembly is folded back to a position parallel to and adjacent to said second pivot arm assembly when the third pivot arm assembly is in the first, deployed position.

* * * * *